(12) United States Patent
May

(10) Patent No.: US 8,035,368 B2
(45) Date of Patent: Oct. 11, 2011

(54) INTEGRATED CIRCUIT, UNIVERSAL SERIAL BUS ON-THE-GO POWER SOURCE AND METHODS FOR USE THEREWITH

(75) Inventor: Marcus W. May, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1640 days.

(21) Appl. No.: 11/352,690

(22) Filed: Feb. 13, 2006

(65) Prior Publication Data

US 2007/0192523 A1    Aug. 16, 2007

(51) Int. Cl.
*G05B 24/02* (2006.01)
(52) U.S. Cl. ........................................ 323/318
(58) Field of Classification Search .............. 323/234, 323/282, 283, 318, 351
See application file for complete search history.

(56) References Cited

U.S. PATENT DOCUMENTS

| | | | |
|---|---|---|---|
| 6,590,597 B1 * | 7/2003 | Kim .............................. | 715/866 |
| 6,760,675 B1 * | 7/2004 | Szwec et al. .................... | 702/78 |
| 6,903,535 B2 * | 6/2005 | Liu et al. ......................... | 323/222 |
| 6,971,032 B2 * | 11/2005 | Ohie et al. ..................... | 713/300 |
| 7,157,960 B2 * | 1/2007 | Kim et al. ...................... | 327/536 |
| 7,315,323 B2 * | 1/2008 | Ito .................................. | 348/207.1 |
| 7,327,691 B2 * | 2/2008 | Abousleman et al. ......... | 370/248 |
| 7,356,715 B2 * | 4/2008 | Okayasu ........................ | 713/300 |
| 7,538,792 B2 * | 5/2009 | Takahashi .................... | 348/207.1 |
| 7,725,182 B2 * | 5/2010 | Sutardja ............................ | 607/9 |
| 7,729,375 B2 * | 6/2010 | Miyazaki et al. .............. | 370/466 |
| 2002/0149695 A1 * | 10/2002 | Kayanuma ..................... | 348/375 |
| 2006/0059289 A1 * | 3/2006 | Ng et al. ......................... | 710/305 |
| 2007/0008688 A1 * | 1/2007 | Liang ............................. | 361/683 |
| 2007/0011341 A1 * | 1/2007 | Liang ............................. | 709/230 |

* cited by examiner

*Primary Examiner* — Adolf Berhane

(74) *Attorney, Agent, or Firm* — Ingrassia Fisher & Lorenz, PC

(57) ABSTRACT

A universal serial bus on-the-go (USB-OTG) power source includes a direct-current to direct-current (DC-to-DC) converter for generating a source voltage when coupled to a battery. A pulse generator generates an oscillating signal when a USB-OTG enable signal is asserted. A power supply module generates a supply voltage from the oscillating signal and the source voltage.

12 Claims, 10 Drawing Sheets ics to provide the functionality of the device. As an example, a handheld audio player may include multiple integrated circuits to support the storage and playback of audio files in order to produce an audio output that is delivered to the user through speakers, headphones or the like. Given the handheld nature of these devices, small size, low weight and long battery life can typically be important considerations in their design.

Many such handheld devices provide an interface, such as a Universal Serial Bus (USB) interface governed by the USB 2.0 specification, for coupling the handheld device to a traditional host device such as a computer, docking port, etc. In a USB On-the-Go (USB-OTG) mode, two USB-OTG devices, such as two handheld devices, can be coupled together. In this fashion, data can be exchanged between two handheld devices, with one device acting as the host and the other device acting as the peripheral. While in the USB-OTG host mode, the handheld device must be capable of supplying power, 5V and up to 8 ma, to the USB-OTG peripheral device. Prior art designs use a switched capacitor charge pump circuit to generate the supply voltage based on a battery. However, the voltage generated by these circuits drops as the battery discharges.

The need exists for a power source for supplying more stable power to external devices that can be efficiently implemented in a handheld device.

DETAILED DESCRIPTION OF THE INVENTION INCLUDING THE PRESENTLY PREFERRED EMBODIMENTS

FIGS. 1-5 present pictorial representations of representative handheld devices in accordance with an embodiment of the present invention. In particular, USB dongle 50 (such as a software authentication device, thumb drive, infrared bridge, Bluetooth or WiFi adapter), handheld audio system 52, digital camera 54, PDA 56 and wireless telephone 58 are representative of the wide variety of electronic devices that can employ the integrated circuit, USB-OTG power source or methods in accordance with the present invention, as described in conjunction with the figures that follow.

Figure 1:
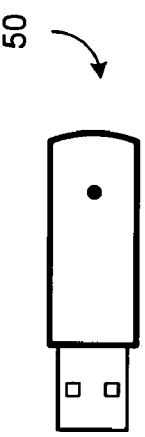
FIGS. 1-5 present pictorial representations of representative handheld devices in accordance with an embodiment of the present invention.
Figure 2:
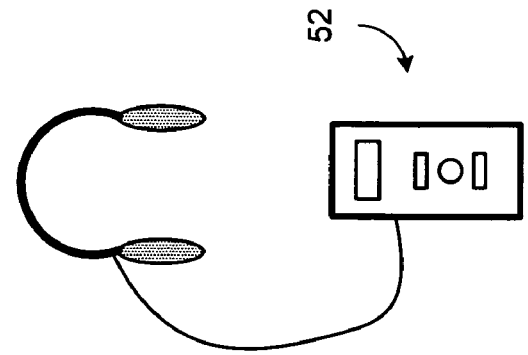
Figure 3:
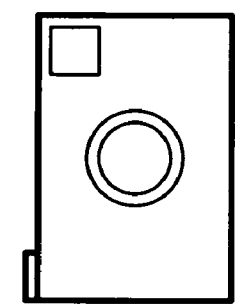
Figure 4:
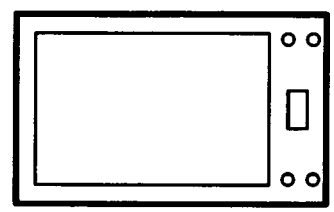
Figure 5:
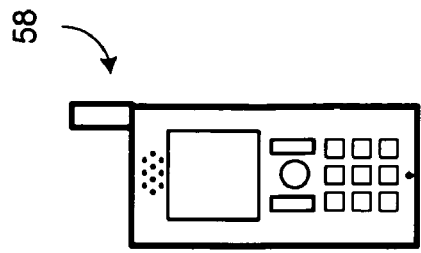
Figure 6:
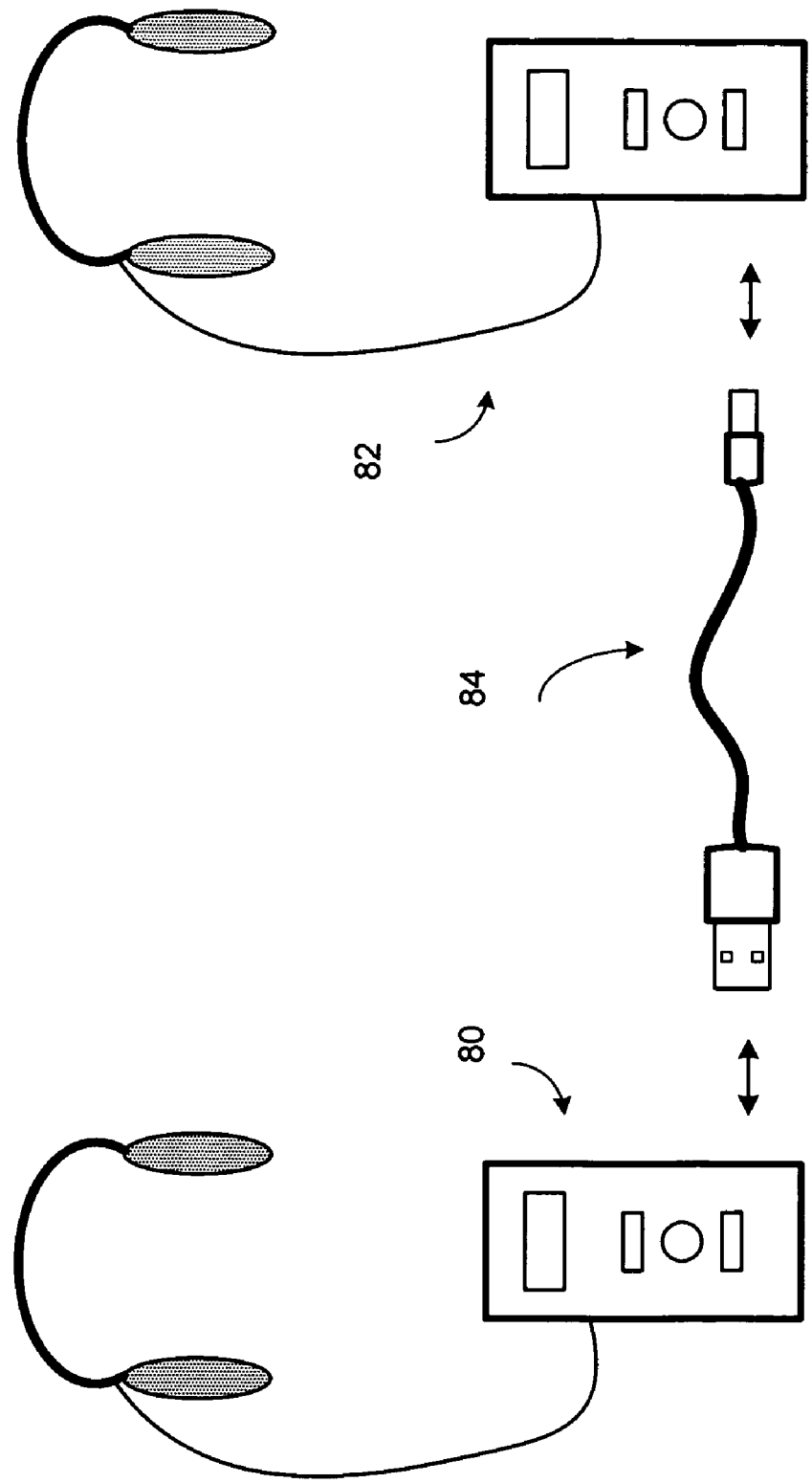
FIG. 6 presents a pictorial representation of the coupling between two devices in accordance with an embodiment of the present invention.

FIG. 6 presents a pictorial representation of the coupling between two devices in accordance with an embodiment of the present invention. In particular, handheld audio systems 80 and 82 are coupled together via cable 84. When coupled, one device, such as handheld audio system 80, serves as the host and handheld audio system 82 serves as the peripheral. Handheld audio systems 80 and 82 can share data over this interface, as would occur normally between a handheld audio device and a traditional host. Handheld audio system 80 includes a USB-OTG power source or integrated circuit in accordance with the present invention that draws power from the battery of handheld audio system 80 to supply handheld audio system 82 via cable 84.

Figure 7:
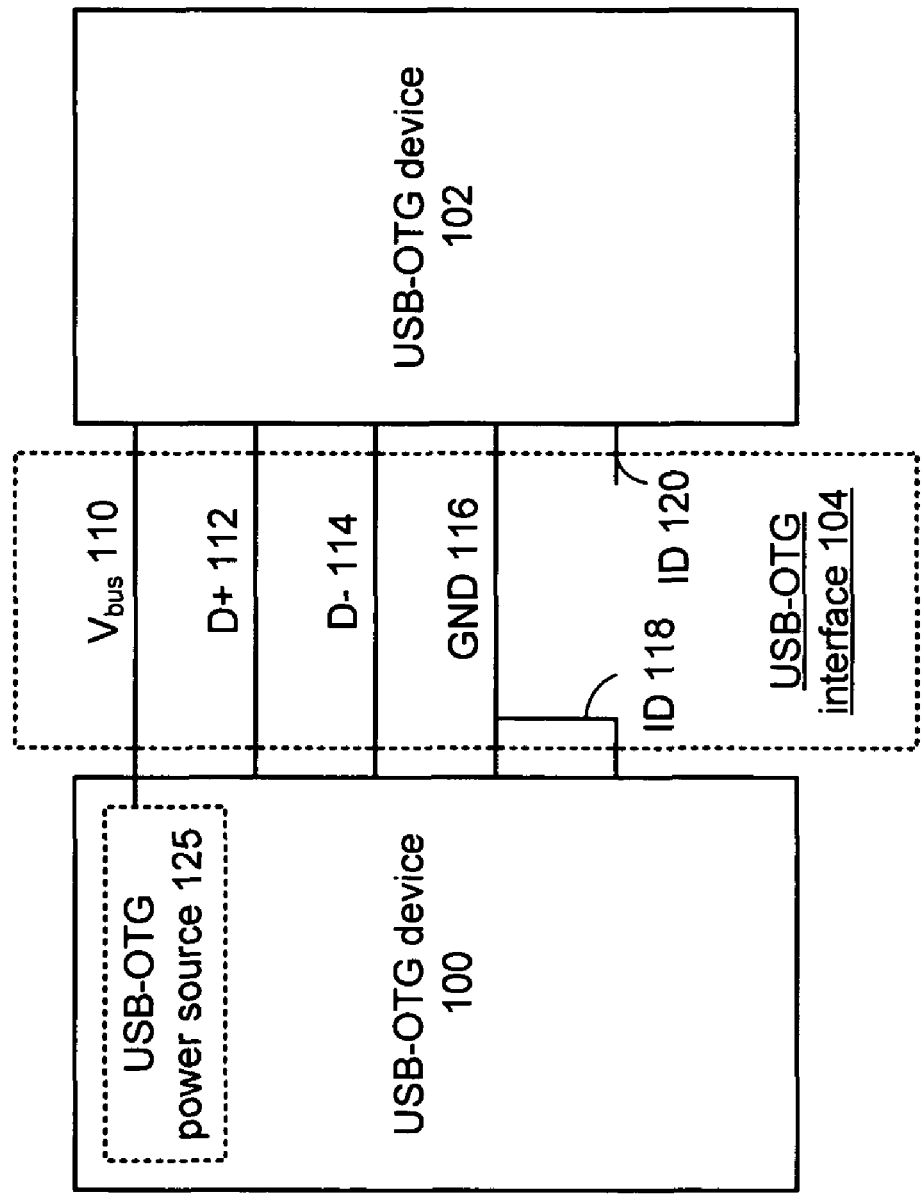
FIG. 7 presents a schematic block diagram representation of a USB-OTG interface in accordance with an embodiment of the present invention.

FIG. 7 presents a schematic block diagram representation of a USB-OTG interface in accordance with an embodiment of the present invention. In particular, two USB-OTG devices 100 and 102, such as handheld audio system 80, handheld audio system 82, USB dongle 50, handheld audio system 52, digital camera 54, PDA 56 and/or wireless telephone 58 are coupled together over a USB-OTG interface 104 that includes $V_{bus}$ line 110, D+ and D− lines 112 and 114, and ground 116.

In an embodiment of the present invention, USB-OTG interface 104 is implemented with a USB cable such as cable 104, however, other cables and connectors can likewise be implemented in accordance with the present invention. In particular, USB-OTG interface 104 couples ID line 118 to ground 116, while ID line 120 is floated. This provides an initial identification of USB-OTG device 100 as the host device (or so-called A device) and USB-OTG device 102 as the initial peripheral device (or so-called B device). The role of either device as the host or peripheral can be negotiated by a Host Negotiation Protocol and data can be exchanged between devices in sessions established in accordance with a Session Request Protocol. Both the Host Negotiation Protocol and Session Request Protocol are set forth in the USB 2.0 Specification.

When USB-OTG device 100 is operating as host, USB-OTG power source 125 supplies a 5 Volt supply voltage on $V_{bus}$ line 110. USB-OTG device 102, in peripheral mode, can draw up to 8 ma of current from $V_{bus}$ line 110. Further details regarding the implementation USB-OTG power source 125, including several functions and features of the present invention, are described in greater detail in conjunction with FIGS. 8 and 9.

Figure 8:
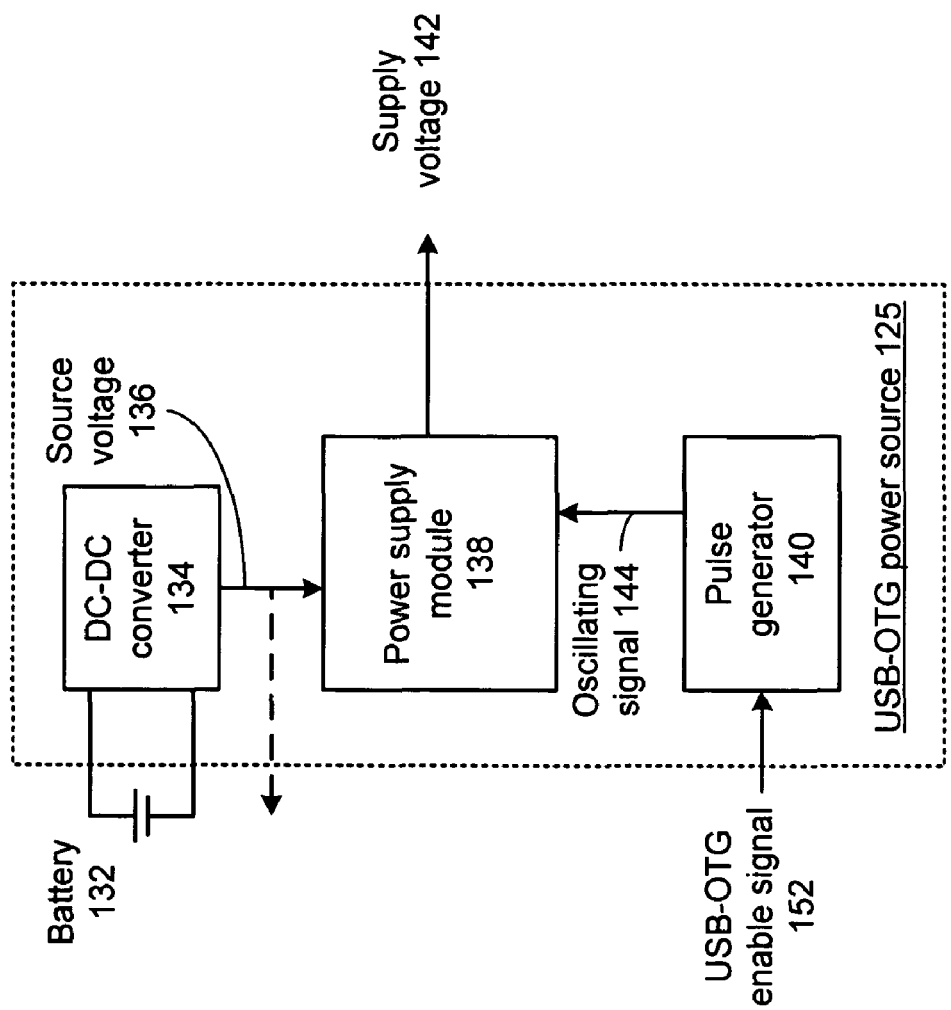
FIG. 8 presents a block diagram representation of a USB-OTG power source in accordance with an embodiment of the present invention.

FIG. 8 presents a block diagram representation of a USB-OTG power source in accordance with an embodiment of the present invention. In particular, USB-OTG power source 125 includes a direct-current to direct-current (DC-to-DC) converter 134 coupled to battery 132 for generating a source voltage 136 when the device is active. Pulse generator 140 generates an oscillating signal when USB-OTG enable signal 152 is asserted. Power supply module 138 generates supply voltage 142 from the oscillating signal 144 and the source voltage 136.

In an embodiment of the present invention, USB-OTG enable signal 152 is asserted by a USB controller of USB-OTG device 100 when USB-OTG device 100 is in host mode. In this fashion, pulse generator 140 is disabled unless supply voltage 142 is required.

In an embodiment of the present invention, DC-DC converter 134 converts the voltage of battery 132 to a source voltage 136 that optionally has multiple purposes and is operatively coupled to power other devices, such as other modules of USB-OTG device 100, whether or not USB-OTG enable signal 152 is asserted and whether or not USB-OTG device 100 is operating as a host device. In an embodiment, DC-DC converter is a regulated power supply that generates a substantially stable source voltage 136. In this fashion, as the battery 132 discharges and its voltage drops, DC-DC converter draws additional current and source voltage 136 remains relatively constant until the battery voltage reaches a low voltage threshold where the source voltage 136 can no longer be maintained.

In an embodiment, pulse generator 140 generates oscillating signal 144 that includes a square wave signal, such as a pulse width modulated (PMW) signal, at a frequency of 25 kHz or greater. In particular, the frequency of oscillating signal 144 can be chosen to avoid interference with other modules of USB-OTG device 100 and further to match the filtering capabilities of power supply module 138. The pulse width of the oscillating signal is modulated with a pulse width/duty cycle to operate at a maximum 8 mA current based on the 5V supply voltage 142. Lower frequency signals can likewise be used, provided appropriate filtering is available in the implementation of power supply module 138. Pulse generator can be implemented using a pulse width modulator, an a stable multi vibrator, voltage controlled or current controlled oscillator or other software or hardware.

Figure 9:
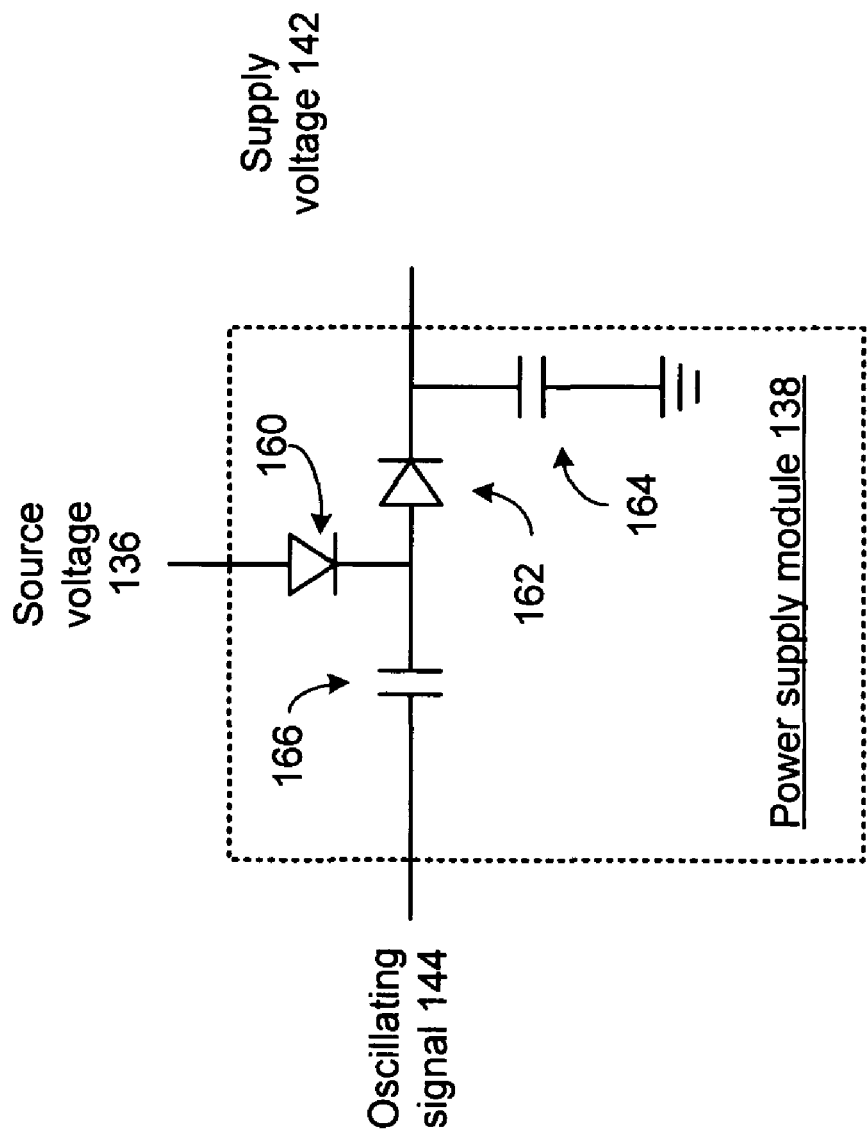
FIG. 9 presents a block diagram representation of a power supply module in accordance with an embodiment of the present invention.

FIG. 9 presents a block diagram representation of a power supply module in accordance with an embodiment of the present invention. In particular, power supply module 138 includes a first rectifier, such as diode 162 having an input node that is coupled to the oscillating signal 144 through capacitor 166 and the source voltage through diode 160. The first rectifier further includes an output node that is operably coupled to the supply voltage 142. A second rectifier, such as diode 160, has an input node coupled to the source voltage 136 and an output node that is coupled to the input node of the first rectifier 162.

In operation, oscillating signal 166 is coupled through capacitor 166 to diode 162 and capacitor 164. Together, these elements provide rectification and filtration of the oscillating signal into supply voltage 142. Because source voltage 136 remains relatively constant as battery 132 discharges, supply voltage 142 is maintained at a substantially constant level, independent of battery voltage, until the voltage of battery 132 drops to the point where the battery 132 can no longer viably power USB-OTG device 100.

Figure 10:
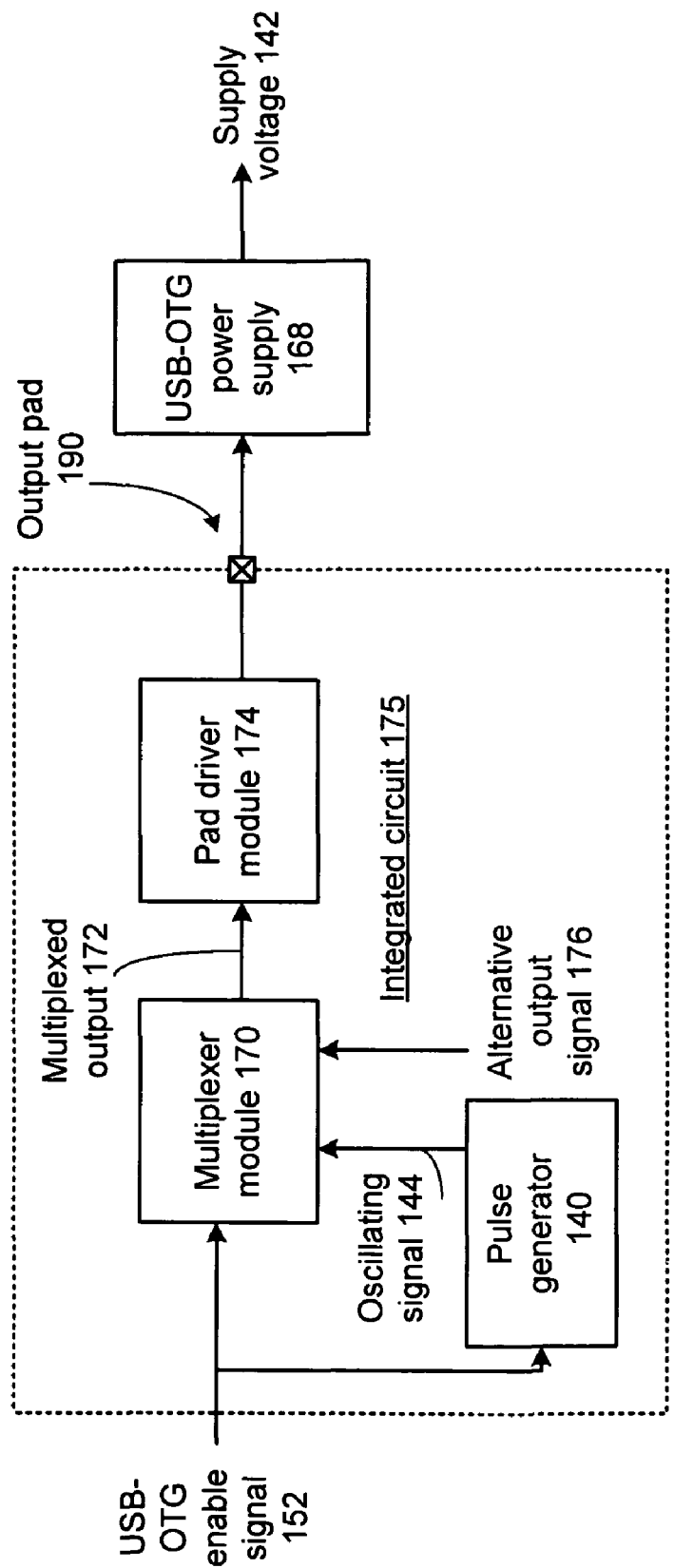
FIG. 10 presents a block diagram representation of an integrated circuit in accordance with an embodiment of the present invention.
Figure 11:
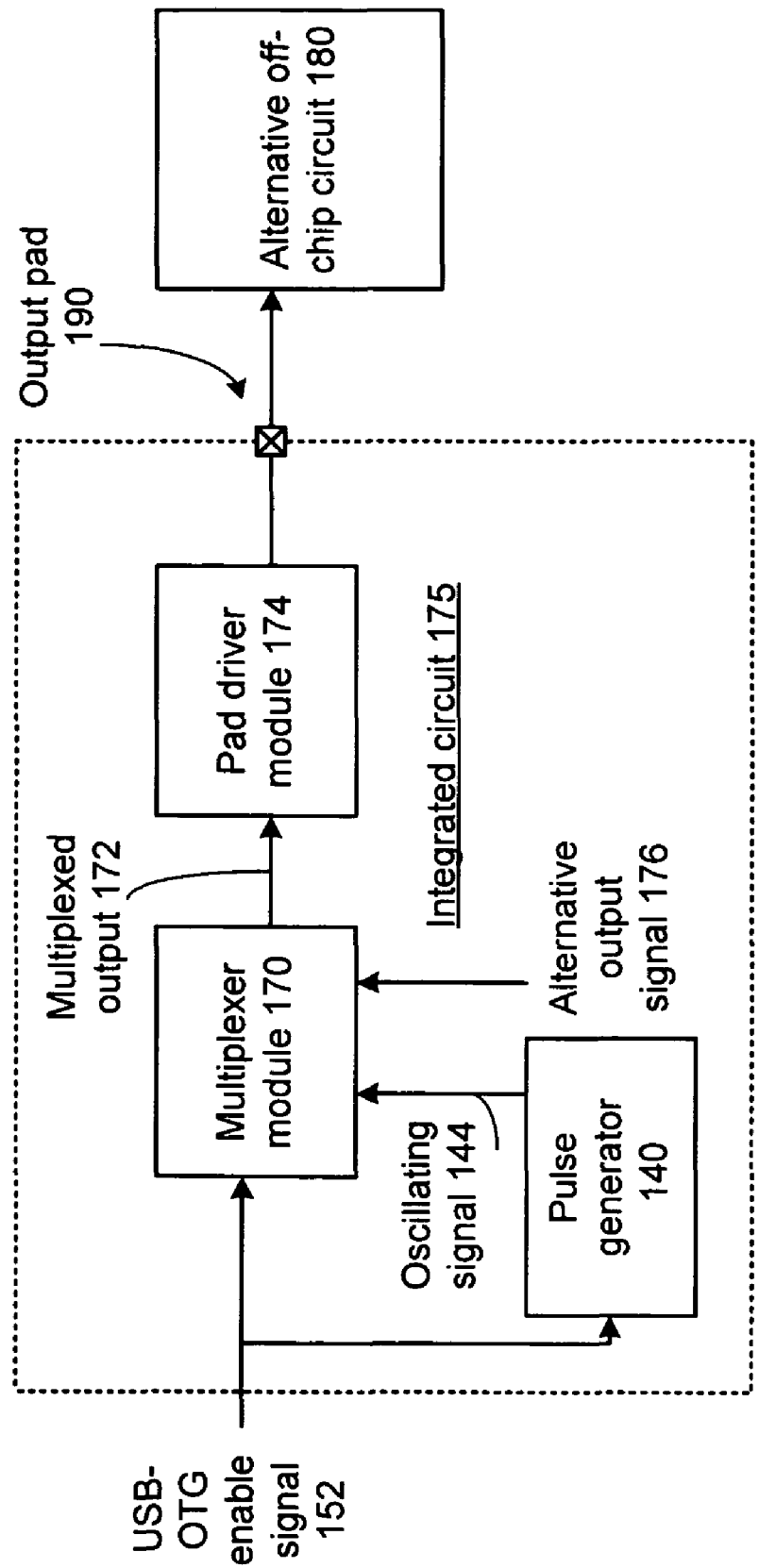
FIG. 11 presents a block diagram representation of an integrated circuit in accordance with an embodiment of the present invention.

FIG. 10-11 present block diagram representations of an integrated circuit in accordance with an embodiment of the present invention. An integrated circuit 175 is presented that can be configured to use an output pad 190 to either to supply oscillating signal 144 to a power supply module, such as USB-OTG power supply 168 or to couple an alternative output signal 176 to an alternative off-chip device 180.

In particular, integrated circuit 175 includes output pad 190 for coupling oscillating signal 144 to a universal serial bus on-the-go (USB-OTG) power supply 168, such as power supply module 138, when USB-OTG enable signal 152 is asserted, as shown in FIG. 10. When USB-OTG enable signal 152 is deasserted, output pad 190 couples an alternative output signal to an alternative off-chip circuit 180, as shown in FIG. 11. In addition, multiplexer module 170 is operably coupled to the output pad 190 for generating a multiplexed output 172 that includes the oscillating signal 144 when the USB-OTG signal 152 is asserted and that includes the alternative output signal 176 when the USB-OTG signal 152 is deasserted. Pad driver module 174 drives the multiplexed output 172 on the output pad 190.

In an embodiment of the present invention, alternative off-chip circuit 180 can be a memory device, interface device, peripheral component, processor, or other off-chip circuit that can be coupled to integrated circuit 175 via output pad 190. Alternative output signal 176 can be an analog or digital signal, discrete time or continuous time signal, that is produced by integrated circuit 175 for alternative off-chip circuit 180.

In an embodiment of the present invention, integrated circuit 175 is capable of performing both of the functions discussed above. However, integrated circuit 175 may be configured for a particular application or design to perform either one function or the other. In an alternative embodiment, integrated circuit 175 can be implemented in a multifunction device and used to perform either function, depending on the application. In this embodiment, an external multiplexer or switch (not shown) can be employed to couple either the USB-OTG power supply 168 or the alternative off-chip circuit 180 to output pad 190 based on whether the USB-OTG enable signal 152 or a similar signal is asserted.

While FIGS. 8-11 have focused on a power source implemented as part of a USB-OTG device 100, other applications of USB-OTG power source 125 and of integrated circuit 175 are likewise possible in other devices, handheld or otherwise. Further, while USB-OTG enable signal 152 has been described as a single signal coupled to multiple devices, USB-OTG enable signal 152 can be implemented with one or more signals that may be analog or digital signals, discrete or continuous time signals, or program variables, states and/or other software instructions implemented by a processing device.

In an embodiment of the present invention, integrated circuit 175 can be implemented using a system on a chip integrated circuit having an analog portion and a digital portion that includes a processing device that performs additional functions associated with the operation of handheld device 100. While integrated circuit 175 has been described as a single integrated circuit, multiple integrated circuits and/or one or more discrete components can likewise be implemented within the broad scope of the present invention.

Figure 12:
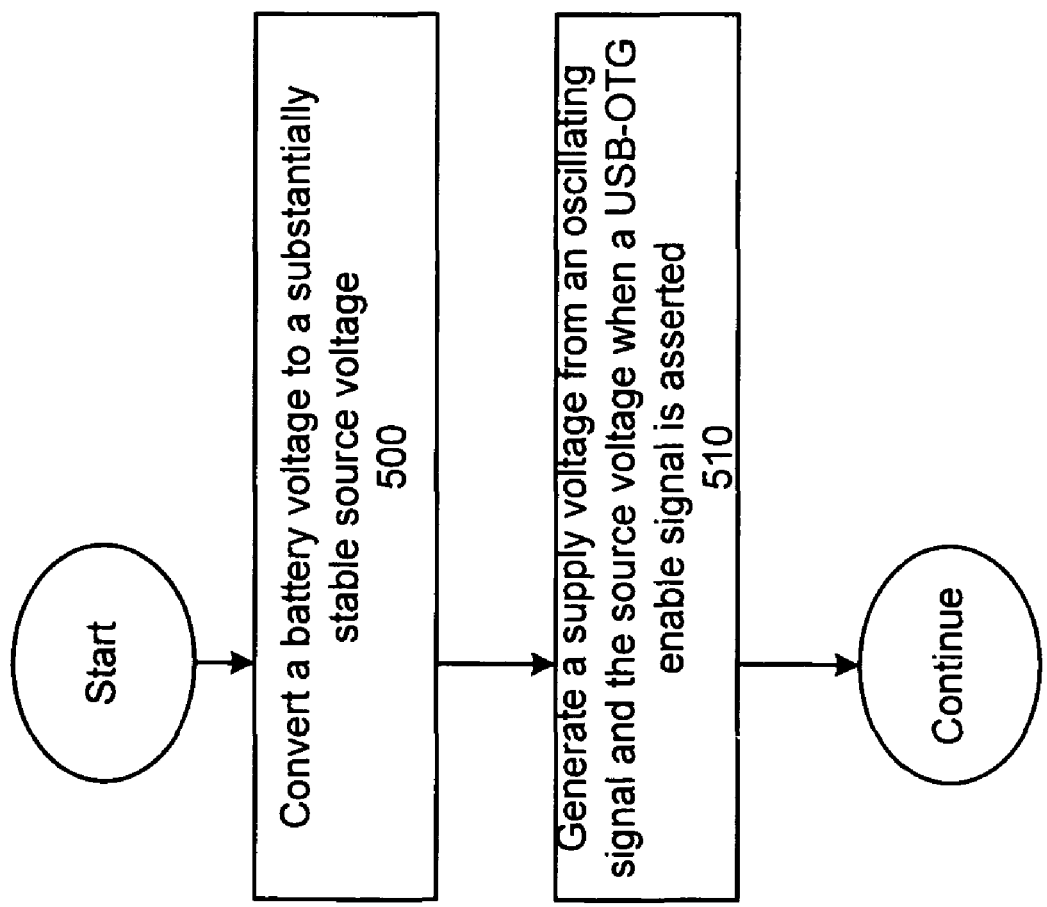
FIG. 12 presents a flowchart representation of a method in accordance with an embodiment of the present invention.

FIG. 12 presents a flowchart representation of a method in accordance with an embodiment of the present invention. In particular, a method is presented for use in conjunction with one or more of the features and functions presented in association with FIGS. 1-11. In step 500, a battery voltage is converted to a substantially stable source voltage. In step 510, a supply voltage is generated from an oscillating signal and the source voltage when a USB-OTG enable signal is asserted. In an embodiment, the oscillating signal includes a pulse width modulated (PWM) signal.

Figure 13:
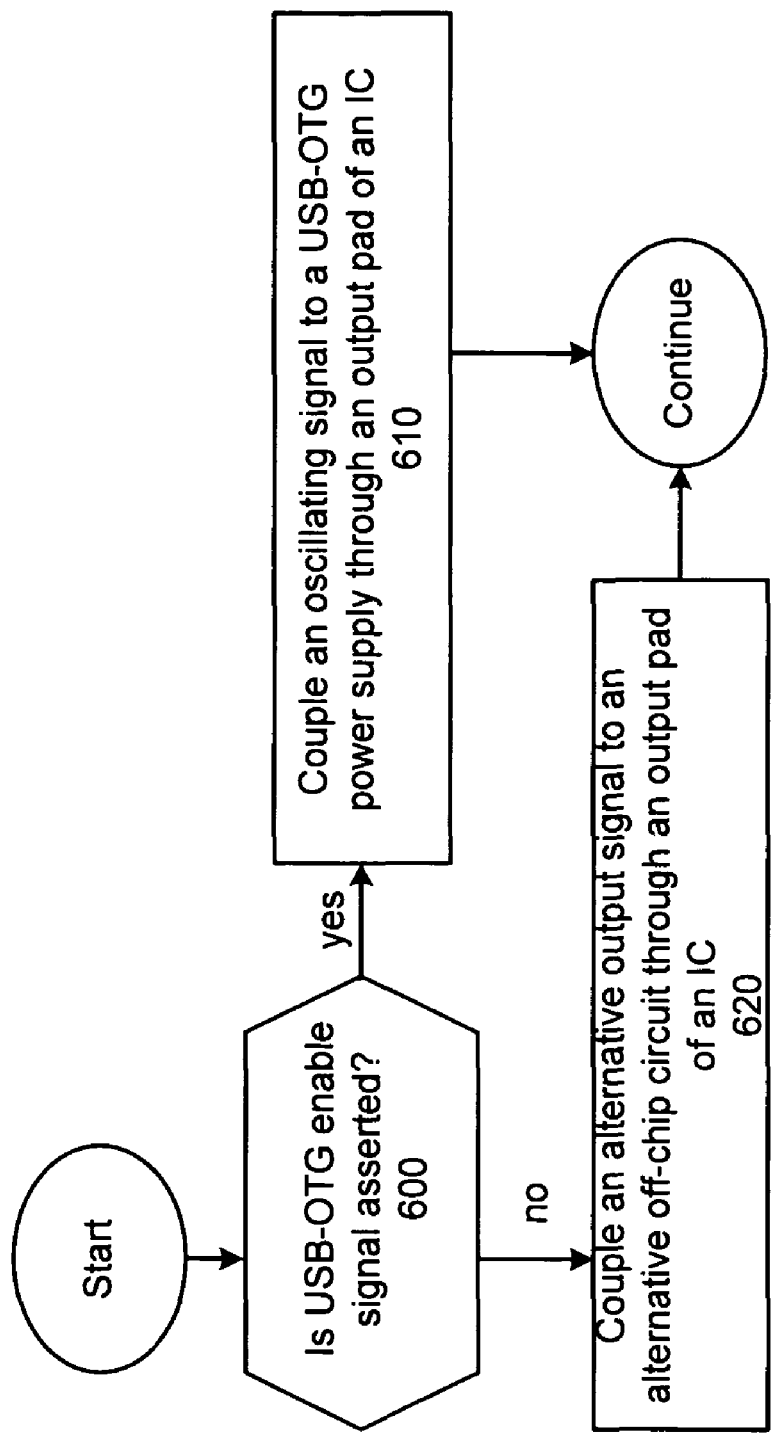
FIG. 13 presents a flowchart representation of a method in accordance with an embodiment of the present invention.

FIG. 13 presents a flowchart representation of a method in accordance with an embodiment of the present invention. In particular, a method is presented for use in conjunction with one or more of the features and functions presented in association with FIGS. 1-12. In step 600, the method determines if a USB-OTG enable signal is asserted. If so, an oscillating signal is coupled to a USB-OTG power supply through an output pad of an integrated circuit as shown in step 610. If not, an alternative output signal is coupled to an alternative off-chip circuit through an output pad of an integrated circuit as shown in step 620.

Figure 14:
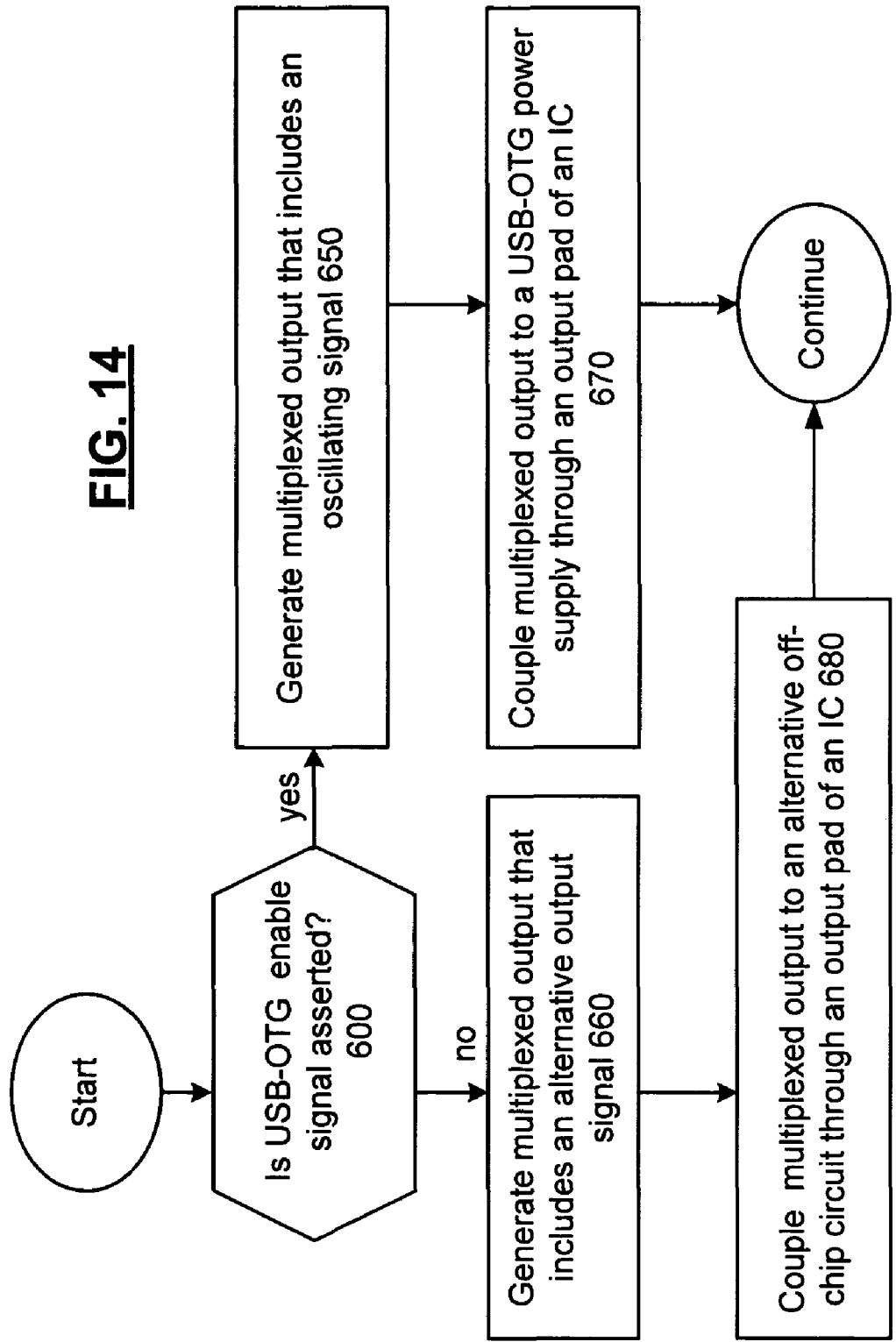
FIG. 14 presents a flowchart representation of a method in accordance with an embodiment of the present invention.

FIG. 14 presents a flowchart representation of a method in accordance with an embodiment of the present invention. In particular, a method is presented for use in conjunction with one or more of the features and functions presented in association with FIGS. 1-12. In step 600, the method determines if a USB-OTG enable signal is asserted. If so, a multiplexed output is generated that includes an oscillating signal as shown in step 650. The multiplexed output is coupled to a USB-OTG power supply through an output pad of an integrated circuit as shown in step 670. In an embodiment of the present invention, the oscillating signal includes a pulse width modulated (PWM) signal.

If the USB-OTG enable signal is not asserted, a multiplexed output is generated that includes an alternative output signal as shown in step 660. The multiplexed output is coupled to an alternative off-chip circuit through an output pad of an integrated circuit as shown in step 680.

In an embodiment of the present invention, the processing device along with various modules (including other elements described as circuits) can be implemented using a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions such as instructions stored in a memory device. The memory device can be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Optionally, the memory stores, and the processing device executes, operational instructions corresponding to at least some of the steps and/or functions illustrated herein.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In an embodiment, the various circuit components are implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing an integrated circuit and USB-OTG power source. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A universal serial bus on-the-go (USB-OTG) power source of a USB-OTG device, the power source comprising:
   a direct-current to direct-current (DC-to-DC) converter for generating a source voltage when coupled to a battery;
   a pulse generator for generating an oscillating signal when a USB-OTG enable signal is asserted by a USB controller of the USB-OTG device when the USB-OTG device is in a host mode; and
   a power supply module for generating a supply voltage from the oscillating signal and the source voltage.

2. The USB-OTG power source of claim 1 wherein the power supply module includes:
   a first rectifier having an input node that is coupled to the oscillating signal and the source voltage and an output node that is operably coupled to the supply voltage; and
   a second rectifier having an input node coupled to the source voltage and an output node that is coupled to the input node of the first rectifier.

3. The USB-OTG power source of claim 1 wherein the oscillating signal includes a pulse width modulated (PWM) signal.

4. The USB-OTG power source of claim 1 wherein the dc-to-dc converter is implemented on an integrated circuit.

5. The USB-OTG power source of claim 1 wherein the integrated circuit includes an output pad for coupling the oscillating signal to the universal serial bus on-the-go (USB-OTG) power supply when a USB-OTG enable signal is asserted and for coupling an alternative output signal to an alternative off-chip circuit when the USB-OTG enable signal is deasserted.

6. An integrated circuit comprising:
an output pad for coupling an oscillating signal to a universal serial bus on-the-go (USB-OTG) power supply when a USB-OTG enable signal is asserted and for coupling an alternative output signal to an alternative off-chip circuit when the USB-OTG enable signal is deasserted, wherein the oscillating signal includes a pulse width modulated (PWM) signal.

7. An integrated circuit comprising:
an output pad for coupling an oscillating signal to a universal serial bus on-the-go (USB-OTG) power supply when a USB-OTG enable signal is asserted and for coupling an alternative output signal to an alternative off-chip circuit when the USB-OTG enable signal is deasserted; and
a multiplexer module, operably coupled to the output pad for generating a multiplexed output that includes the oscillating signal when the USB-OTG signal is asserted and that includes the alternative output signal when the USB-OTG signal is deasserted.

8. The integrated circuit of claim 7 further comprising:
a pad driver module, operably coupled to the output pad and to the multiplexer module, for driving the multiplexed output on the output pad.

9. A method comprising:
converting a battery voltage to a substantially stable source voltage;
producing an oscillating signal; and
generating a supply voltage from the oscillating signal and the source voltage when a USB-OTG enable signal is asserted.

10. The method of claim 9 wherein the oscillating signal includes a pulse width modulated (PWM) signal.

11. A method comprising:
coupling an oscillating signal to a universal serial bus on-the-go (USB-OTG) power supply through an output pad of an integrated circuit when a USB-OTG signal is asserted, wherein the oscillating signal includes a pulse width modulated (PWM) signal; and
coupling an alternative output signal to an alternative off-chip circuit through an output pad of an integrated circuit when the USB-OTG signal is deasserted.

12. A method comprising:
coupling an oscillating signal to a universal serial bus on-the-go (USB-OTG) power supply through an output pad of an integrated circuit when a USB-OTG signal is asserted;
coupling an alternative output signal to an alternative off-chip circuit through an output pad of an integrated circuit when the USB-OTG signal is deasserted; and
generating a multiplexed output that includes the oscillating signal when the USB-OTG enable signal is asserted and that includes the alternative output signal when the USB-OTG enable signal is deasserted.

* * * * *